May 9, 1939.　　　　　G. D. JOHNSON　　　　　2,157,263
VALVE ACTUATING MECHANISM
Original Filed Dec. 21, 1936　　　3 Sheets-Sheet 1
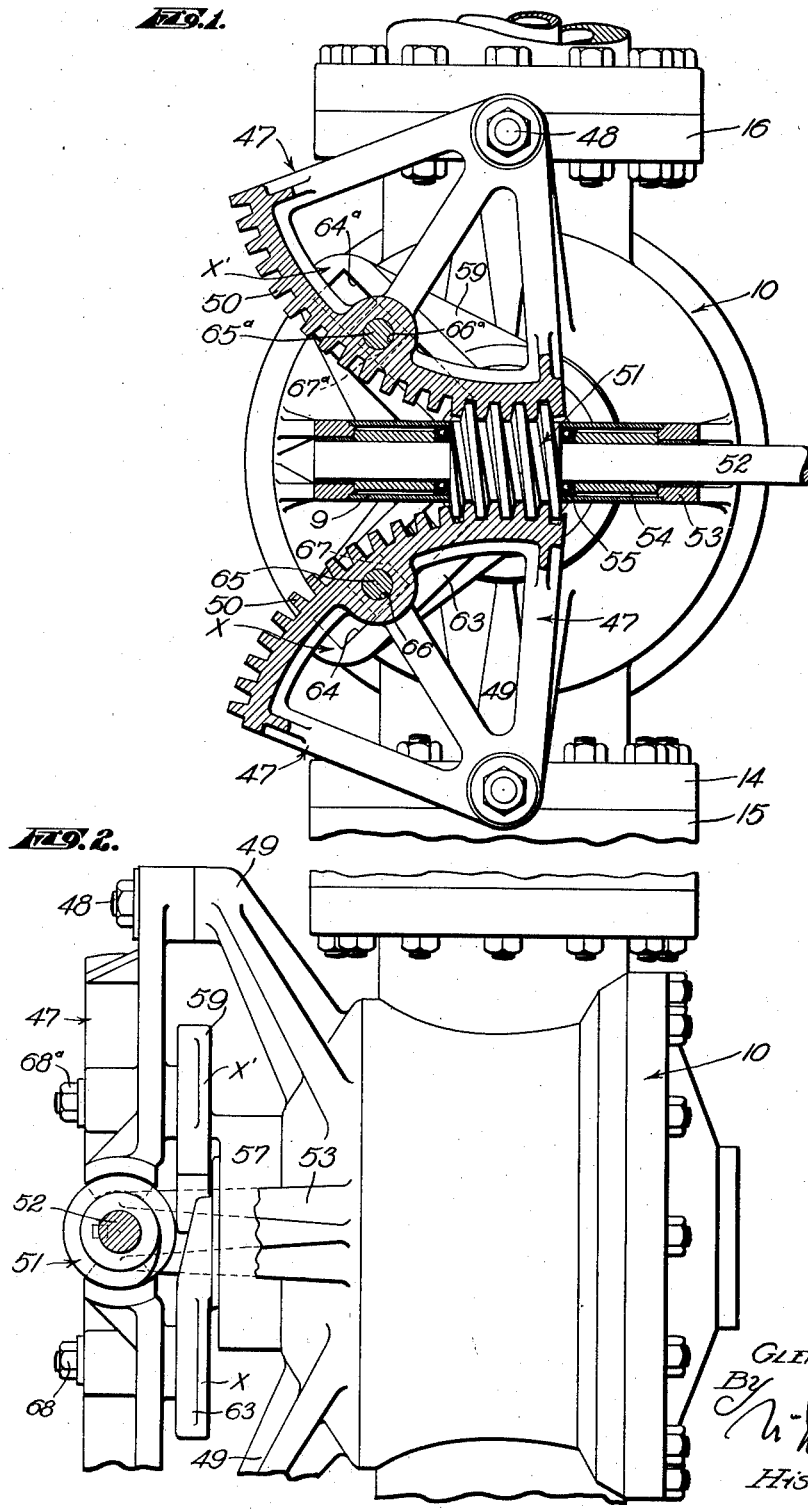
Inventor
GLENN D. JOHNSON
By
His Attorney May 9, 1939.   G. D. JOHNSON   2,157,263
VALVE ACTUATING MECHANISM
Original Filed Dec. 21, 1936   3 Sheets-Sheet 2
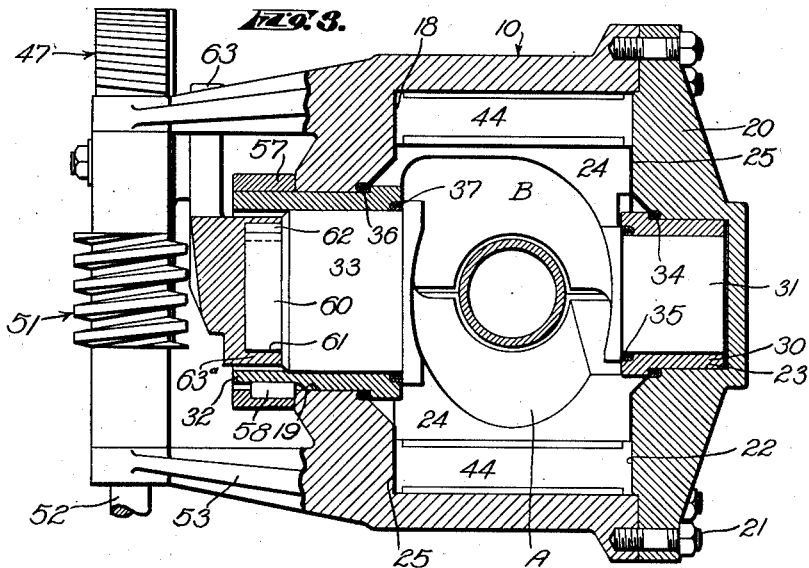
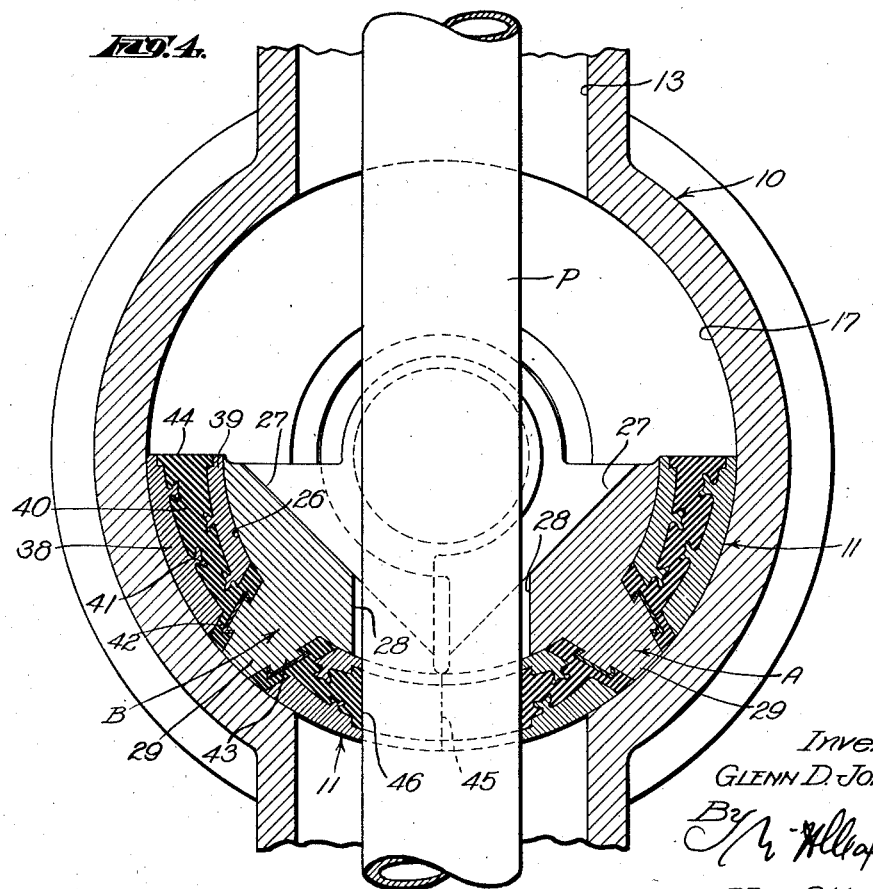
Inventor
GLENN D. JOHNSON
By
His Attorney May 9, 1939.  G. D. JOHNSON  2,157,263
VALVE ACTUATING MECHANISM
Original Filed Dec. 21, 1936  3 Sheets-Sheet 3
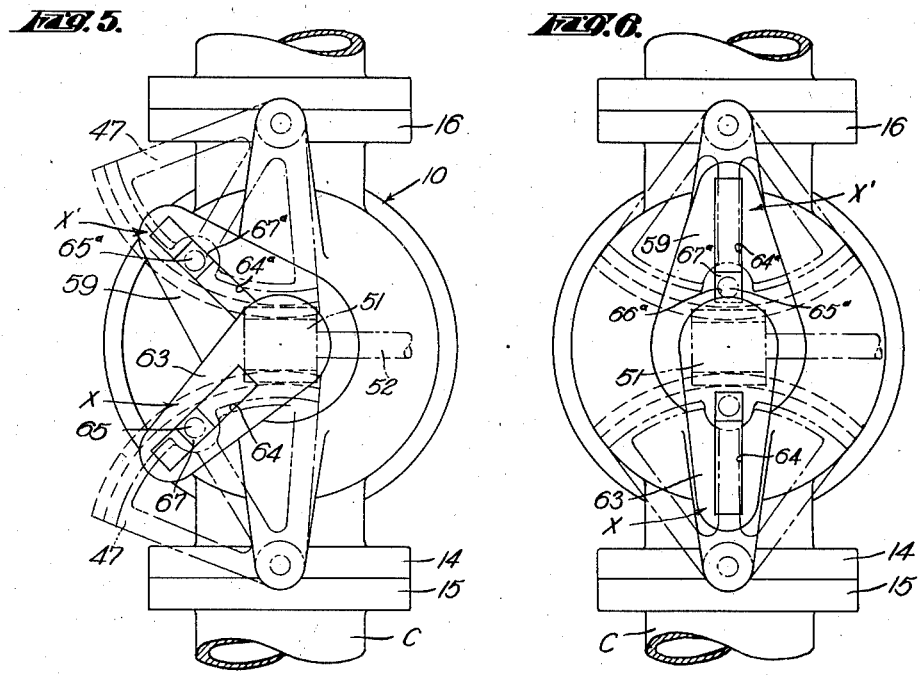
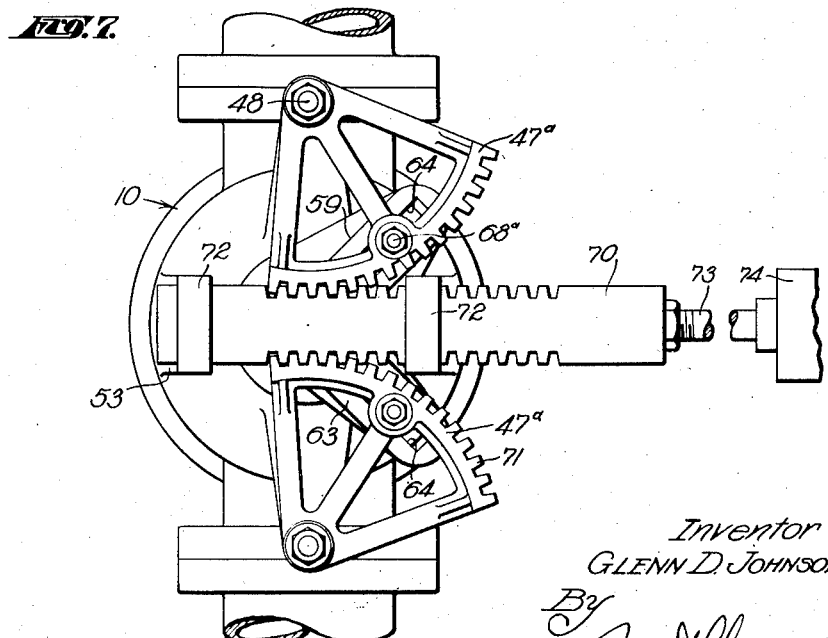
Inventor
GLENN D. JOHNSON
By
His Attorney Patented May 9, 1939

2,157,263

UNITED STATES PATENT OFFICE 2,157,263

VALVE ACTUATING MECHANISM

Glenn D. Johnson, Compton, Calif., assignor to Baash-Ross Tool Company, Los Angeles, Calif., a corporation of California Original application December 21, 1936, Serial No. 116,872. Divided and this application August 27, 1937, Serial No. 161,263

9 Claims. (Cl. 137—139)

This invention relates to valves and relates more particularly to a mechanism for operating valves such as the control valves for wells. A general object of this invention is to provide a practical, dependable and highly efficient mechanism for operating a valve.

This application is a division of my application for Letters Patent of the United States Serial No. 116,872, filed December 21, 1936.

Another object of this invention is to provide a mechanism for operating a valve such as the control valve of a well that is operable to simultaneously move two gates or valve members between their open and closed positions.

Another object of this invention is to provide a valve operating mechanism of the character mentioned that is operable to move the gates or valve elements rapidly during the initial phases of their movements toward the closed positions and that operates to impart heavy positive closing forces to the valve elements as they approach their closed positions to assure a complete cut-off of the fluid under pressure in the well.

Another object of my invention is to provide a valve operating mechanism of the character mentioned embodying novel and very effective driving connections between the gear elements of the mechanism and the gate members of the valve, which connections produce increasingly greater leverage or mechanical advantage as the valve members approach their closed positions.

Another object of my invention is to provide a valve actuating mechanism of the character mentioned that is operable to offer positive resistance to movement of the valve members and that is operable to positively hold the valve members in the closed positions against the fluid pressure in the valve body.

A further object of my invention is to provide a valve actuating mechanism of the character mentioned that is small and compact and that is adapted for actuation by any suitable power means.

The various objects and features of my invention will be fully understood from the following detailed description of typical, preferred forms and applications of the invention, throughout which description reference is made to the accompanying drawings, in which:

Fig. 1 is a front view of a well control valve showing certain parts of one form of actuating mechanism of the invention in vertical cross section. Fig. 2 is a side elevation of the valve and the actuating mechanism. Fig. 3 is a horizontal detailed sectional view of the valve and mechanism showing the valve members closed about a pipe extending through the valve body. Fig. 4 is an enlarged fragmentary vertical detailed sectional view of the valve showing the valve members engaging about the pipe. Fig. 5 is a reduced diagrammatic front view of the valve showing the various elements of the actuating mechanism in the positions they assume when the valve members are sealing about a pipe extending through the valve. Fig. 6 is a view similar to Fig. 5 showing the elements of the actuating mechanism in the positions they assume when the valve members are in the full open positions and Fig. 7 is a front view of the valve showing another form of actuating mechanism of the invention with its parts in the positions where the valve members are fully closed to effect a full shut off.

The valve actuating mechanism of the present invention is adapted for use in connection with valves and like devices of various natures and the mechanism may be varied somewhat to adapt it for specific applications. In the following detailed description I will describe two typical forms of the invention as employed to operate a well control valve of the character fully described and claimed in my co-pending application referred to above. It is to be understood that the invention is not to be construed as limited or restricted to the specific forms or application about to be described, but is to be taken as including any features or modifications that may fall within the scope of the claims.

The well control valve illustrated in the drawings includes a body 10, valve members A and B in the body 10, and packing means 11 on the members A and B.

The body 10 is a hollow structure to be connected with the upper end of the well casing C. The body is provided with a longitudinal or vertical opening 13 to register with the opening in the well casing C. The body 10 is connected with the casing C, having a flange 14 on its lower end bolted to a similar flange 15 on the upper end of the casing C. A flange 16 may be provided on the upper end of the body 10 around the opening 13 to facilitate the connection of fittings, etc., with the body.

The body 10 is provided with a transverse opening 17 intersecting the opening 13. The opening 17 enters one side of the body 10 and a flat, substantially vertical wall 18 occurs at its inner end. An opening 19 of reduced diameter and in concentric relation to the opening 17 extends into the body 10 to have its inner end at the wall 18. The outer end of the opening 17 is closed by a head or cap 20 secured to the body 10 by studs 21. The inner side of the cap 20 presents a flat, substantially vertical wall 22 at the end of the opening 17. A cylindrical socket 23 is provided in the inner side of the cap 20.

The valve members A and B are provided to close off the opening 13 communicating with the upper end of the casing C in the event that high pressures suddenly develop in the well. The valve members A and B have the general configuration of sectors of an annulus or ring. The sides 24 of the members A and B are generally flat and are radial relative to the longitudinal axis of the opening 17. The ends 25 of the members A and B are flat and substantially parallel to the adjacent opposing end walls 18 and 22 of the opening 17. The peripheries 26 of the members A and B are cylindrically curved and are substantially concentric with the cylindrically curved wall of the opening 17. The interiors of the members A and B have grooves 27 with cylindrically curved walls that are concentric with and coincident with or outward of the cylindrical plane of the wall of the opening 13 when the members A and B are in their open positions. When the members A and B are in the full open positions the grooves 27 in effect constitute continuations of the opening 13 so that a drill pipe and other equipment may be operated through the casing C without interference. The lower sides of the members A and B are provided with complementary grooves 28 having cylindrically curved walls. The grooves 28 are adapted to more or less freely receive the drill pipe P when the members A and B are in the operative positions where the packing means 11 seals about the pipe P. An axially extending rib 29 projects from the periphery 26 of each member A and B. The outer surfaces of the ribs 29 may be cylindrically curved and may slidably engage the wall of the body opening 17.

The members A and B are supported for oscillatory movement about a common horizontal axis coincident with the axis of the opening 17. The valve member A is provided with a tubular boss or trunnion 30 rotatable or turnable in the socket 23. The valve member B is provided with a horizontally projecting stub shaft or trunnion 31 turnable in the opening of the tubular trunnion 30. The end of the member B adjacent or opposing the wall 18 has a horizontally projecting tubular trunnion 32 rotatable or turnable in the opening 19. The tubular trunnion 32 extends completely through the opening 19 to project from the exterior of the body 10. The valve member A is provided with a horizontally projecting trunnion 33 turnable in the tubular trunnion 32. The trunnion 33 extends completely through the trunnion 32. From the above it will be seen that the two valve members A and B have telescopically arranged journals or trunnions supporting them for oscillatory movement about the longitudinal axis of the opening 17.

A channeled sealing leather or washer 34 is recessed in the inner portion of the opening 23 to seal about the trunnion 30. A similar channeled washer 35 is recessed in the inner end of the trunnion 30 to seal about the trunnion 31. A grooved or channeled sealing washer 36 is recessed in the inner portion of the opening 19 to pack about the inner part of the trunnion 32. A similar channeled washer 37 is recessed in the inner end of the trunnion 32 to seal about the trunnion 33.

The packing means 11 are carried by the members A and B to seal with the internal walls of the body 10 and to cooperate to fully seal off the opening 13 and, therefore, the upper end of the casing C when there is no drill pipe or other equipment in the well and to seal with the internal walls of the body 10 and to pack about the pipe P when the same is extending into the casing C. The packing means 11 includes two units or assemblies on the periphery of each of the members A and B. Each packing assembly includes an outer floating plate 38 and an inner plate 39. The outer plates 38 have cylindrically curved outer surfaces adapted to slidably engage the wall of the opening 17. The inner plates 39 are shaped to conform to the cylindrical peripheries 26 of the members A and B. The plates 38 and 39 extend circumferentially from adjacent the ribs 29 to planes beyond the sides of the members and extend axially or longitudinally of the members to have their ends slightly inset from the ends of the members.

Layers 40 of rubber or other packing material are interposed between the plates 38 and 39. The layers 40 of packing material are vulcanized on the opposing surfaces of the plates 38 and 39. Dove-tailed tongues 41 on the opposing surfaces of the plates 38 and 39 are embedded in the layers 40 of packing. Inserts 42 of dove-tailed cross-sectional configuration are molded in the inner longitudinal edges of the layers 40 to receive or cooperate with dove-tailed tongues 43 on the sides of the ribs 29 to secure the packing assemblies to the ribs. The layers 40 of rubber or packing material extend to the opposite ends of the sections A and B and project beyond the ends of the plates 38 and 39. The end portions of the layers 40 may overlie the ends of the plates 38 and 39 and present flat end surfaces for cooperating with the walls 18 and 22.

The upper longitudinal edges or sides 44 of the layers 40 of the uppermost packing assemblies are adapted to abut or cooperate when the members A and B are swung to the closed positions to effect a full shut off. The lower longitudinal sides 45 of the layers 40 of the lower packing assemblies are flat and straight, being substantially radial relative to the axis of movement of the members A and B. Notches 46 are provided in the lower sides of the lower packing assemblies to interrupt the surfaces 45 and the lower surfaces or edges of the plates 38 and 39. The notches 46 are partially cylindrical and their walls are curved concentric with the walls of the above described grooves 28. When the members A and B are operated to the positions illustrated in Fig. 4 of the drawings the grooves 28 and the notches 46 receive the drill pipe P so that the surfaces 45 come into sealing cooperation.

The operating mechanism provided by this invention is operable to swing or move the valve members A and B between the open positions where their grooves 27 are concentric with the opening 13 and the positions illustrated in Fig. 4 where the packing means 11 seal about the pipe P and with the wall of the body opening 17 and is operable to swing the members A and B between the full open positions to the positions where the surfaces 44 of the packing means 11 cooperate to close off the body opening 13 and to effect a full shut off of the well.

The valve actuating mechanism of the invention illustrated in Figs. 1 to 6, inclusive, of the drawings includes, generally, a driving gear 51, a pair of gears 47 meshing with and driven by the gear 51 and operative connections X and X' between the gears 47 and the closure members A and B, respectively, of the valve.

The driving gear 51 is preferably arranged at the exterior of the valve body 10 and is such that it may be driven by any suitable source of power. The present invention is not concerned with the power means employed for rotating the gear 51 and the power means has been omitted from the drawings. The gear 51 is preferably in the nature of a worm and is fixed to a shaft 52. The driving gear shaft 52 is journaled in arms 53 projecting from the valve body 10. The shaft 52 extends beyond one arm 53 for connection with the power means (not shown). The worm or gear 51 is fixed to the shaft 52 between its ends and is spaced between the supporting arms 53. Bushings 54 surround the shaft 52 and have their outer ends in bearing engagement with the supporting arms 53. Thrust bearings 55 are provided between the inner ends of the bushings 54 and the adjacent ends of the gear 51 for the transmission of end thrusts. Lubricant retaining sleeves or tubes 9 preferably surround the bushings 54 and the thrust bearings 55. The axis of rotation of the shaft 52 and the driving gear 51 is preferably substantially diametric of and normal to the common axis of turning of the valve members A and B.

The gears 47 mesh with and are driven by the gear 51. In the preferred construction illustrated in the drawings the gears 47 are in the nature of quadrant gears provided at their peripheries with worm teeth 50 which mesh with the worm gear 51. The gears 47 are supported for individual turning about spaced axes transverse of the axis of rotation of the gear 51 in such a manner that they mesh with the gear 51 at diametrically opposite points or zones. In the particular application of the invention illustrated in the drawings arms 49 project from the valve body 10 and carry horizontally projecting shafts 48. The gears 47 are rotatably or turnably supported on the shafts 48 and extend therefrom to mesh with the driving gear 51. The quadrant gears 47 may have the usual spaced spokes and the outer portions or peripheral portions of the gears 47 are preferably flanged or thickened to carry the teeth 50.

The operative connections X and X' are important features of the invention. The operative connection X operatively connects the valve member A with one of the gears 47 while the connection X' operatively connects the valve member B with the other gear 47. The operative connections X and X' are such that turning of the gears 47 by rotating the gear 51 effects simultaneous movement of the valve members A and B, the directions of these movements of the members depending upon the direction of rotation of the gear 51.

The connection X includes a part on the trunnion 33 of the valve member A. In practice this part may be a concentric pin 60 of reduced diameter on the outer end of the trunnion 33. The connection X further includes a crank 63 carried by or connected with the pin 60. In the particular construction illustrated in the drawings the crank 63 has a hub or boss 63ª extending into the outer end of the trunnion 32 with clearance. The boss 63ª has a socket 61 receiving the pin 60. A key 62 connects the boss 63ª and the pin 60 against relative turning. The crank 63 projects radially outward relative to the axis of turning of the valve members A and B. The crank 63 has an elongate opening or slot 64. The slot 64 is of substantial length and has flat parallel side walls.

The operative connection X further includes a part on the gear 47 adjacent the crank 63 cooperating with the slot 64 in the crank 63. In the preferred construction a pin 65 is turnable in an opening 66 in the outer portion of the gear 47 and has a flat sided head or block 67 slidable in the slot 64. A nut 68 may be threaded on the pin 65 to prevent loss of the pin from the opening 66. The block 67 carried by the gear 47 and operating in the slot 64 is operable to transmit movement from the gear 47 to the crank 63 and the valve member A. The parts are related so that the block 67 is in the upper or inner portion of the slot 64 and the gear 47 has its intermediate teeth 50 in cooperation with the gear 51 when the valve member A is in its full open position. Fig. 6 of the drawings illustrates this position and relationship of the parts. When the gear 47 is turned from the intermediate position just described the block 67 cooperating with the slot 64 effects turning of the crank 63 and as the crank turns the block 67 moves outwardly in the slot.

The operative connection X' includes a crank 59 similar to the crank 63. A tubular boss or collar 57 is provided on the inner end of the crank 59 and surrounds the projecting portion of the trunnion 32 on the valve member B. The collar 57 is secured against turning on the trunnion by a key 58. The crank 59 projects radially from its collar 57. An elongate slot 64ª is provided in the crank 59. The slot 64ª has flat parallel side walls and the slot is of substantial length. A pin 65ª is rotatable in an opening 66ª in the adjacent gear 47 and a block 67ª is fixed on one end of the pin 65ª. The block 67ª is slidable in the slot 64ª of the crank 59. A nut 68ª may be threaded on the pin 65ª to prevent the loss of the pin from the opening 66ª. The block 67ª carried by the gear 47 is operable to transmit movement from the gear to the crank 59. The parts are related so that the block 67ª is in the lower or inner portion of the slot 64ª and the intermediate teeth of the gear 47 mesh with the gear 51 when the valve member B is in its fully open position. When the said gear 47 is turned by rotation of the gear 51 the block 67ª cooperating with the slot 64ª effects turning of the crank 59 and the valve member B and as the crank turns the block 67ª moves outwardly in the slot 64ª.

It will be apparent that turning of the gear 51 results in simultaneous swinging of the gears 47 in opposite directions. This movement of the gears 47 is translated into swinging movement of the cranks 63 and 59 by the blocks 67 and 67ª cooperating with the slots 64 and 64ª, respectively. When the valve members A and B are in their full open positions the cranks 59 and 63 are substantially vertical. It is to be particularly noted that an increase in leverage or mechanical advantage is obtained in the operation of the members A and B as they move toward their closed positions. The blocks 67 and 67ª move outwardly in the slots 64 and 64ª when the valve members A and B are operated toward their closed positions and as the members A and B approach their closed positions the blocks 67 and 67ª are greater distances from the axis of movement of the cranks and an increasingly greater leverage is obtained due to the changing relationship between the gears 47 and their related cranks. For this reason the operative connections X and X' are capable of developing great force and power to operate the valve members A and B to their closed positions against high fluid pressures that may exist in the valve body 10.

Fig. 8 of the drawings illustrates a form of valve operating mechanism of the invention in which the gears 47ª are operated by a shiftable rack 70. The gears 47ª may be identical with the above described gears 47 except that their teeth 71 are shaped to mesh with the teeth on the rack 70. The rack 70 is a double rack, that is, it has rows of teeth on opposite sides for meshing with the teeth 71 of the gears 47ª. The rack 70 may be supported and guided by guides 72 carried by the above described arms 53. The gears 47ª are operatively associated with their respective cranks 63 and 59 by the operative connections X and X' described above. In the particular arrangement illustrated in the drawings the rack 70 is operated by a cylinder and piston mechanism 74. An operating rod 73 is connected with the rack 70 and extends into an adjacent cylinder and piston mechanism 74. The rod 73 may be connected with or may constitute the piston rod of the mechanism 74. It is believed that it will be understood how the cylinder and piston mechanism 74 is operable to move the translatable rack 70 to effect the desired movement of the valve members A and B.

Under normal conditions the parts of the operating mechanism may be in the positions illustrated in Fig. 6 of the drawings so that the valve members A and B are in intermediate positions where their grooves 27 are aligned with the opening 13. In the event that high pressures suddenly develop in the well when the drill pipe P is extending through the body 10 the shaft 52 may be turned to move the gears 47 to the positions illustrated in Fig. 5 of the drawings. During this movement of the gears 47 the blocks 67 and 67ª cooperate with the slots 64 and 64ª to cause turning of the cranks 63 and 59. This turning the cranks 63 and 59 is accompanied by corresponding turning of the valve members A and B. When the valve members A and B are moved to their closed positions as just described the packing layers 40 cooperate and seal about the pipe P at the notches 46. The actuating mechanism of the invention is adapted to apply heavy turning forces to the valve members A and B so that their packing means 11 are brought into tight cooperation to assure a complete seal about the pipe P. As described above, the leverage or mechanical advantage resulting from the operation of the blocks 67 and 67ª in the slots 64 and 64ª increases as the members A and B approach their closed positions and considerable force may be imposed on the valve members to assure the complete closing off of the upper end of the well casing C about the pipe P. When it is desired to close off the well casing C when the pipe P is not present in the casing the operation is the same as described above except that the shaft 52 is turned in the opposite direction to move the valve members A and B to the positions where the surfaces 44 of the packing means 11 come into cooperation to provide a tight seal between the two valve members. The packing means 11 also seals with the wall of the body opening 17 so that the valve members A and B effect a full seal or closure.

It is to be observed that the valve operating mechanism provided by the invention may effect the simultaneous turning of the valve members A and B between either of their closed positions and the open position. The mechanism effects the rapid initial movement of the valve members A and B from their full open positions toward either of their closed positions and imparts increasingly greater turning forces to the valve members as they approach their closed positions.

Having described only typical preferred forms and applications of my invention I do not wish to be limited or restricted to the specific details herein set forth, but wish to reserve to myself any variations or modifications that may appear to those skilled in the art or fall within the scope of the following claims.

Having described my invention, I claim:

1. In combination, a pair of members independently rotatable about a common pivotal axis, two levers, one connected with each of said members, a pair of gears carried on spaced pivotal axes, means for simultaneously turning the gears, and operative connections between the gears and levers whereby turning of the gears effects simultaneous turning of the levers.

2. In combination, a pair of members independently rotatable about a common pivotal axis, two levers, one connected with each of said members, the levers having slots, a pair of gears carried on spaced axes, means for simultaneously turning the gears, and parts on the gears cooperating with the slots to transmit turning force to the levers and members.

3. In combination, a pair of valve closure members having a common pivotal axis and swingable into engagement with one another to effect a closure, a crank connected with each closure element, an actuating gear, gears arranged at opposite sides of the actuating gear and meshing with the actuating gear, the last named gears having axes of turning spaced from said common axis of the members, a sliding driving connection between one of the cranks and one of the said last named gears, and a sliding driving connection between the other crank and the other last named gear, said sliding driving connections transmitting increasingly heavier turning forces to the cranks and closure members as the members move together to provide a tight closure.

4. In combination, a pair of members independently turnable about a common axis, cranks turnable with the closure members and projecting in substantially opposite directions, a pair of gears supported for turning about spaced axes spaced at opposite sides of said common axis, a sliding driving connection between one of the cranks and one of the gears, a sliding driving connection between the other crank and the other gear, and a driving gear arranged between and meshing with the first mentioned gears to effect turning thereof to simultaneously turn said members.

5. In combination, a pair of members independently turnable about a common axis, cranks secured to the members and projecting in substantially opposite directions, a pair of gears supported for turning about spaced axes spaced at opposite sides of said common axis, a sliding driving connection between one of the cranks and one of the gears, a sliding driving connection between the other crank and the other gear, and a driving gear located in a plane substantially diametric of the common axis of movement of the said members and meshing with the first mentioned gears to effect turning thereof to simultaneously turn said members.

6. In combination, a pair of members independently turnable about a common axis, cranks secured to the members and projecting in substantially opposite directions, a pair of gears supported for turning about spaced axes spaced at opposite sides of said common axis, a sliding driving connection between one of the cranks and one of the gears, a sliding driving connection between the other crank and the other gear, and a rack arranged between and meshing with the first mentioned gears to effect turning thereof to simultaneously turn said members.

7. Actuating means for a valve having a pair of closure members independently turnable about a common axis to be movable together into sealing cooperation, the said means comprising, cranks turnable with the closure members and projecting in substantially opposite directions, each crank having a longitudinal slot, a pair of gears supported for turning about spaced axes, a part on one gear cooperating with one of said slots, a part on the other gear cooperating with the other slot, the cooperation of said parts with the slots being such that increasing mechanical advantage is obtained to force the closure members into tighter cooperation as the parts move out in their respective slots, and means for turning the gears.

8. Actuating means for a valve having a pair of closure members independently turnable about a common axis to be movable toward one another into cooperation, the said means comprising, cranks turnable with the closure members and projecting in substantially opposite directions, each crank having a slot, a pair of gears supported for turning about spaced axes, a turnable part on one gear slidably cooperating with the slot in one crank, a turnable part on the other gear slidably cooperating with the slot in the other crank, the cooperation of said parts with the slots being such that increasing mechanical advantage is obtained to force the closure members into tighter cooperation as the parts move out in their respective slots, and a worm meshing with said gears to turn the same whereby said parts transmit movement to the cranks and closure members.

9. In a control gate for a well casing having a body to be connected with the casing and having an opening forming a continuation of the opening in the casing and a pair of oscillatory valve members in the body turnable toward one another into sealing engagement, the combination of a pair of gears rotatable on spaced axes, a double rack meshing with the gears, a cylinder and piston mechanism operating the rack, levers on the valve members each having a longitudinal slot, and operative connections between the gears and the levers whereby the gears operate the levers, said connections comprising parts on the gears cooperating with the slots and movable outwardly in the slots as the gears turn in given directions to produce increasingly greater leverage to bring the valve members into tight cooperation as such turning of the gears continues.

GLENN D. JOHNSON.